No. 638,073. Patented Nov. 28, 1899.
I. SMITH.
ROTARY METER.
(Application filed July 3, 1899.)
(No Model.)

Witnesses: N. H. Robbins, E. Hume Talbot

Inventor: Isaac Smith by Ewell & Dick, attys

UNITED STATES PATENT OFFICE.

ISAAC SMITH, OF NOTTINGHAM, ENGLAND.

ROTARY METER.

SPECIFICATION forming part of Letters Patent No. 638,073, dated November 28, 1899.

Application filed July 3, 1899. Serial No. 722,728. (No model.)

*To all whom it may concern:*

Be it known that I, ISAAC SMITH, a subject of the Queen of Great Britain, residing at Nottingham, in the county of Nottingham, England, have invented new and useful Improvements in Rotary Meters, of which the following is a specification.

This invention relates to improvements in rotary meters for measuring liquids, and has for its object the production of a meter in which the rotary drum is perfectly balanced and in which the revolutions of the drum correspond with the quantity of liquid passing through the same.

Figure 1:
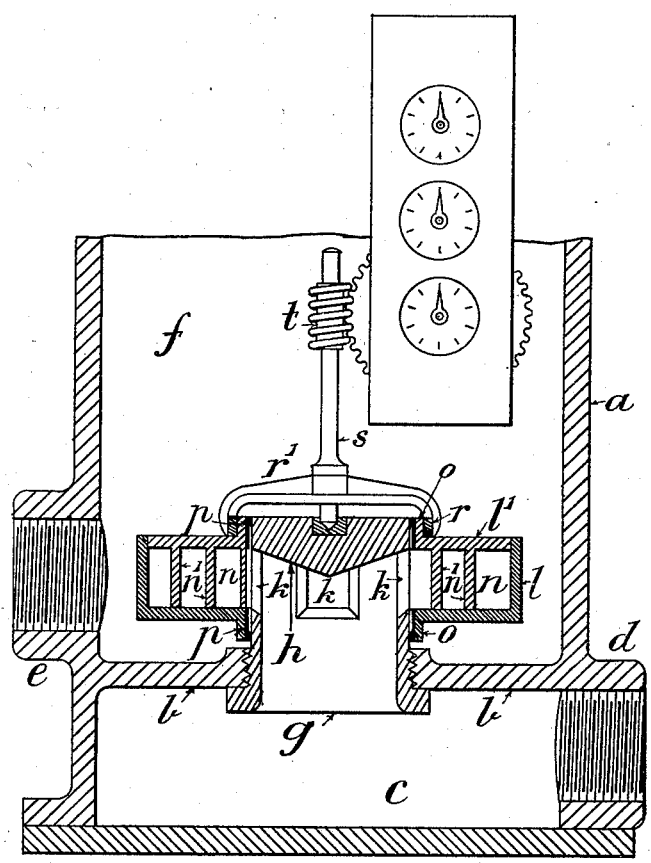
Figure 2:
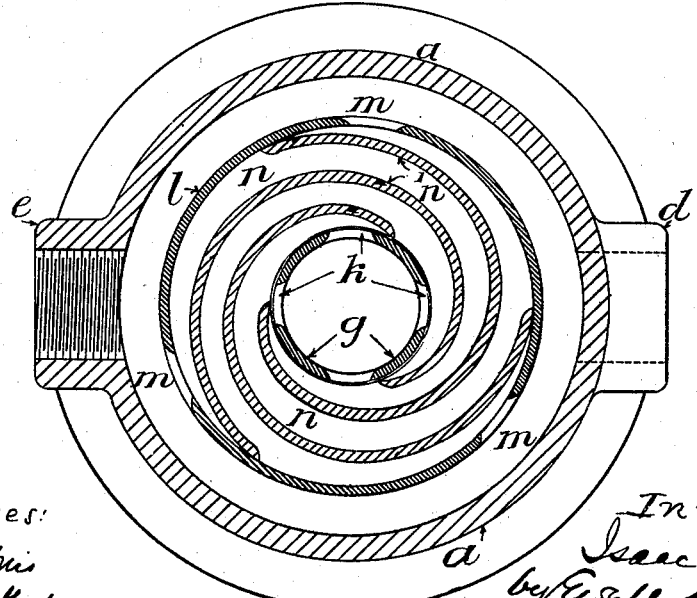

In the accompanying drawings, Figure 1 is a vertical section through the center of the meter, and Fig. 2 is a sectional plan through the center of the drum.

The improved meter is contained in an outer case $a$, which is closed at the top and bottom by suitable cover-plates and is divided by a partition $b$ into an inlet-chamber $c$ with nozzle $d$ and an outlet-chamber $f$ with nozzle $e$, both nozzles being made with flanges or screwed for pipe connections, and at the inlet-nozzle there is by preference a strainer to prevent the ingress of dirt and the like. Into the center of the partition $b$ there is fixed a circular port-box $g$ with port-holes $k$ and with its upper end closed by an inwardly-projecting cone-piece $h$, by which the inflowing liquid is directed through the ports $k$ to channels $n$ in a drum which is fitted to revolve on the outside of the port-box $g$. This drum consists of a hollow box $l$ and a lid-piece $l'$, this latter carrying spirally-curved strips $n'$, arranged to form spirally-curved channels $n$, which decrease in sectional area from the center of the drum. The sides of the box $l$ are provided with outlet-ports $m$, and by having the parts $l$ and $l'$ independent of each other the position of the ports $m$ relatively to the ends of the strips $n$ can be varied as may be required, and the two parts $l$ and $l'$ can then be fastened together by screws or the like. The box and lid are made by casting, pressing, or other known process out of aluminium or other light metal not affected by the liquid to be measured and are provided with bearings $o$, which are lined with antifriction metal bushes $p$, so as to insure a practically watertight joint between the inside of the drum and the outside of the port-box and to enable the drum to revolve with the minimum amount of friction.

On the outside of the top-bearing $o$ there is fitted a ring $r$, having a cross-bar $r'$, which carries a spindle $s$, the lower end of which runs in a bearing on the cone-piece $h$. The spindle $s$ above the cross-bar is provided with a worm $t$, which is geared to the recording mechanism and is by preference supported in a bearing at its upper end.

In the meter shown there are three channels $n$ and four ports $k$. There may, however, be two or more channels, provided there is sufficient area for the liquid to pass through and sufficient surface in the sides of the channels to insure the revolution of the drum without slip or congestion of the liquid passing through the same, and preferably the number of ports $k$ is different to the number of channels $n$, as this arrangement insures greater regularity in the flow of the liquid, and the drum is thereby better balanced.

When the improved apparatus is used with liquids under great pressure, a volute spring may be placed at one or both ends of the spindle $s$ to prevent damage by shock or the drum may be fitted to revolve on ball-bearings.

The improved apparatus herein described with reference to its use as a meter may also be used as a rotary motor or rotary pump and may transmit or receive its power by belts or other gearing.

Having now described my invention, what I claim, and desire to secure by Letters Patent of the United States, is—

1. The combination of an inlet-port box closed at its upper end and provided with inlet-ports, a hollow drum with an opening top and bottom, spirally-curved passages in the drum, the number of which is less than the number of inlet-ports, an outlet-port to each channel, bearings above and below the drum, a pivot supporting the drum, and recording mechanism, substantially as herein described.

2. The combination of an inlet-port box having inlet-ports, a directing-cone, a hollow drum, spirally-curved channels in the drum less in number than the number of inlet-ports so that every channel is always receiving water, openings in the top and bottom of the drum, bearings above and below the drum, antifriction metal bushes in such bearings, outlet-ports in the drum, a pivot supporting the drum, and recording mechanism, substantially as herein described.

3. The combination of an inlet-port box, inlet-ports therein, a directing-cone, a hollow drum, outlet-ports in the drum, a lid closing the drum, two or more spirally-curved pieces attached thereto and forming similarly-curved channels in the drum, a central pivot supporting the drum, recording mechanism, connections between the drum and recording mechanism substantially as herein described.

ISAAC SMITH.

Witnesses:
   THOMAS HENRY MALTBY,
   WILLIAM HENRY POTTER.